A. H. STEVENS.
Corn Sheller.
No. 5,569.
Patented May 16, 1848.
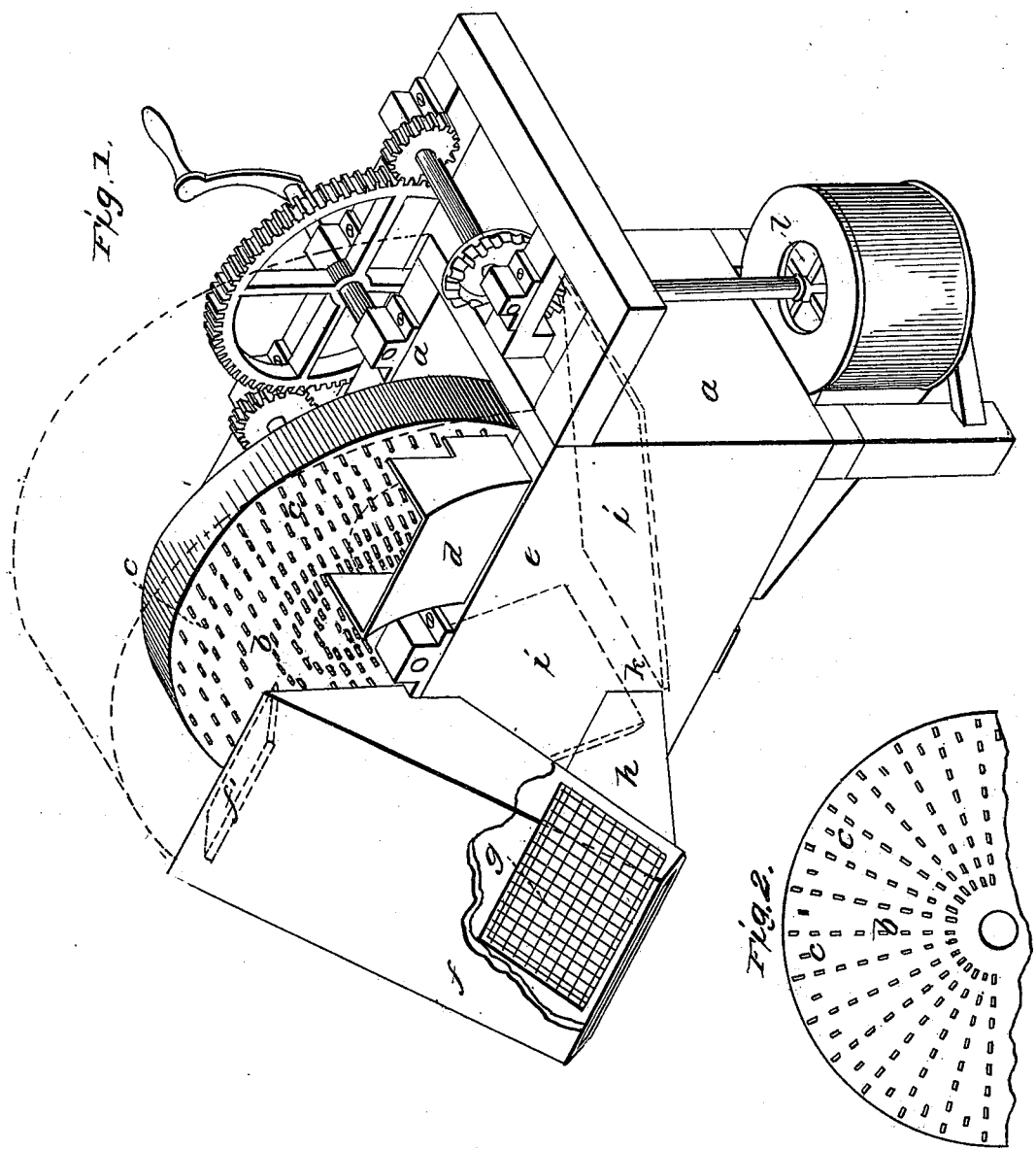

UNITED STATES PATENT OFFICE.

A. H. STEVENS, OF GENEVA, NEW YORK.

CORN-SHELLER.

Specification of Letters Patent No. 5,569, dated May 16, 1848.

*To all whom it may concern:*

Be it known that I, A. H. STEVENS, of Geneva, in the county of Ontario and State of New York, have invented new and useful Improvements in Machinery for Shelling and Cleaning Corn from the Cob, and that the following is a full, clear, and exact description of the principle or character which distinguishes them from all other things before known and of the manner of making, constructing, and using the same, reference being had to the accompanying drawings, making part of this specification, in which—

Figure 1 is an isometrical view of the apparatus, and Fig. 2, a portion of the toothed disk by which the corn is shelled and the cob discharged.

The same letters indicate like parts in all the figures.

The nature of my invention consists in so arranging the teeth on the face of the revolving disk so that the cobs shall be carried around as far as is found necessary and then discharge them, while the corn is all conveyed down through a blast and is winnowed from the chaff which is blown away.

The parts are constructed as follows: A suitable inclosed frame (a, a) is found to fold the shelling disk (b) the axle of which has its bearings in the caprices of the frame (a) on the face of the disk the teeth are arranged in radial rows as clearly shown in Fig. 2; these rows are placed at a sufficient distance apart to let the ear of corn to be shelled lay between them and this space should be varied for the different sized corn to be shelled, the teeth also should project just in proportion as near as may be to the length of the corn longer for the ground seed corn than for the smaller kinds. It will be seen that near the periphery of the disk a tooth (c) is placed between the rows, this is for the purpose of holding the cob from falling out from the disk till it is brought around to its proper place.

In my numerous experiments I found it impossible to bring around the cob correctly until I adopted the above arrangement which although it requires a greater number of teeth than are absolutely necessary to shell they are necessary to properly conduct the cob to the place of discharge. The ears of corn to be shelled are put into a hopper (d) and are caught by the revolving disk (b) and carried around against the stationary breast piece (e) of common construction where the corn is shelled off the cob being brought around to the spout (f) where it is thrown out by means of an inclined piece (f') (shown in dotted lines) attached to the upper part of the spout for that purpose. Near the outer end of this spout a grating (g) is placed in the bottom; (this is shown by a portion of the top being broken away for that purpose in Fig. 1) and from this grating a spout (h) conducts the corn down into the machine so that if any corn should chance to be taken around and thrown out by the cob through the spout (f) it is returned back by the spout (h).

Two inclined planes are affixed in the frame below the shelling disk (b) as shown in Fig. 1 by the dotted lines (i, i) thus forming a hopper to conduct down the corn to a point (k) within the machine where it crosses a blast from a fan wheel (l) and is cleared of the chaff, etc.; it will also be perceived that all the corn that falls into the spout (f) is reconducted by spout (h) to the same place.

What I claim as my invention and desire to secure by Letters Patent is—

1. The arrangement of the teeth on the disk, as herein described, in radial lines in combination with teeth near the periphery between said lines substantially in the manner and for the purpose set forth.

2. I also claim the combination of the spouts (f) and (h) therewith for effectually separating the corn from the cobs, after shelling, as above described.

A. H. STEVENS.

Witnesses:
J. J. GREENOUGH,
J. M. THAYER.